United States Patent [19]
Pasquier

[11] Patent Number: 5,972,534
[45] Date of Patent: Oct. 26, 1999

[54] CELL CONTAINING A DEVICE FOR INSERTING A STACK OF ELECTRODES AND HOLDING IN PLACE

[75] Inventor: Eric Pasquier, Saint-Benoit, France

[73] Assignee: Saft, Romainville, France

[21] Appl. No.: 08/941,671

[22] Filed: Sep. 30, 1997

[30] Foreign Application Priority Data

Oct. 3, 1996 [FR] France ................. 96 12 059

[51] Int. Cl.[6] .................. H01M 2/16; H01M 2/18
[52] U.S. Cl. ................. 429/144; 429/66; 429/142; 429/176
[58] Field of Search ................. 429/144, 247, 429/66, 176, 142

[56] References Cited

U.S. PATENT DOCUMENTS

| | | |
|---|---|---|
| 1,506,944 | 9/1924 | Rich .......................................... 429/66 |
| 4,729,933 | 3/1988 | Oswald . |
| 4,973,531 | 11/1990 | Zama et al. ............................ 429/66 X |

FOREIGN PATENT DOCUMENTS

| | | |
|---|---|---|
| 1545388 | 11/1968 | France . |
| 2075174 | 10/1971 | France . |
| 7331852U | 3/1975 | Germany . |
| 2834411A1 | 2/1980 | Germany . |
| 3040018A1 | 7/1982 | Germany . |
| 62-64050 | 3/1987 | Japan . |
| 447296 | 3/1968 | Switzerland . |
| 1205430 | 9/1970 | United Kingdom . |
| 1312013 | 4/1973 | United Kingdom . |

OTHER PUBLICATIONS

Patent Abstracts of Japan, vol. 017, No. 110 (E–1329), Mar. 8, 1993 corresponding to JP 04 294071A (Yuasa Battery Co. Ltd) Oct. 19, 1992.

Patent Abstracts of Japan (vol. 016), No. 521 (E–1285), Oct. 27, 1992 corresponding to JP 04 196063 A (Shin Kobe Electric Mach Co Ltd) Jul. 15, 1992.

*Primary Examiner*—John S. Maples
*Attorney, Agent, or Firm*—Sughrue, Mion, Zinn, Macpeak & Seas, PLLC

[57] ABSTRACT

A cell contains a device for inserting a stack of electrodes and holding it in place. This device enables a stack of electrodes to be inserted and held in place in a container having a base and receiving a lid, the stack having two opposite plane faces and the container having two opposite plane walls. The device comprises two tapes connected by a central blade and is disposed between the plane faces of the stack and the plane walls of the container. The two tapes form elastic cylindrical sectors, advantageously parabolic in shape, with the concave side facing outwards when fitted.

6 Claims, 2 Drawing Sheets

CELL CONTAINING A DEVICE FOR INSERTING A STACK OF ELECTRODES AND HOLDING IN PLACE

BACKGROUND OF THE INVENTION

1. Field of the Invention

The invention concerns a cell containing a device for inserting a stack of electrodes and holding it in place in a container having a base and receiving a lid, said stack having two opposite plane faces and said container having two opposite plane walls.

It can be a cell in which the stack of electrodes comprises a flattened coil inserted into a pot to which the last negative electrode turn must be connected.

2. Description of the Prior Art

Disposing spacers, possibly conductive spacers, between the electrodes and the container is known in itself (cf. for example US-2 842 607). Spacers with ribs or other raised patterns intended among other things to compress the stack of electrodes in order to optimize its performance in terms of power are also known in themselves (cf. for example EP-0 666 608), but this pressure is not constant, varying in particular with deformation of the stack (bulging consequent upon discharge cycles). The same problem arises in a locating and insertion device known in itself comprising two tapes connected by a central blade and adapted to be disposed between the plane faces of the stack (coil) and the plane walls of the container (pot).

The aim of the invention is to solve this problem by proposing a cell containing a device for applying a pressure to the stack of electrodes that is more uniform in time than in prior art devices.

SUMMARY OF THE INVENTION

The invention consists in a cell comprising a container having a bottom and two opposite plane walls, a stack of electrodes with two opposite plane faces and a bottom having a length which is the same as the width of said stack and a width which is the same as the thickness of said stack, and a device for inserting said stack in said container and maintaining it under a compressive force therein including a central blade having dimensions at least equal to those of said bottom of said stack joined by its opposite longitudinal edges to two tapes having dimensions at least equal to those of said plane faces of said stack and forming elastic cylindrical sectors with the concave side facing outwards, said device being adapted to be disposed between said plane faces of said stack and said plane walls of said container with said blade bearing on said bottom.

To obtain a uniform pressure on the plane faces of the stack the bearing surface area of the tapes must be at least equal to the surface area of these plane faces. If the surface area of the tapes is smaller, the pressure is applied to only a part of the stack and causes unwanted deformation. Because of the thinness of the separator employed this deformation can lead to shortcircuits between the electrodes. It can also cause heterogeneous operation of the cell because of an unequal distribution of current density.

The dimensions of said tapes are advantageously 1 mm to 2 mm greater than the width of said plane faces. Consequently, said blade has a length slightly greater than the length of said bottom part.

The straight edges of the sectors are held precisely in position either by their connection to the blade or by their linear bearing engagement with the top of the container, which is stiffened by the lid welded to it. They apply a pressure to the stack of electrodes that is substantially uniform in time.

The cylindrical sectors can be formed by a generatrix based on a directrix consisting of a conic section arc, in particular a circular arc or preferably a parabolic arc, which provides the most uniform pressure along the coil. The cylindrical sectors can also be prism-shaped, approximating the aforementioned arcs to a greater or lesser degree.

The tapes are preferably of spring stainless steel and at least their inside face is copper-plated.

The blade and/or the tapes are advantageously apertured.

Other features and advantages of the invention will emerge from the following description given with reference to the accompanying drawings.

DETAILED DESCRIPTION OF THE PREFERRED EMBODIMENTS

Figure 1:
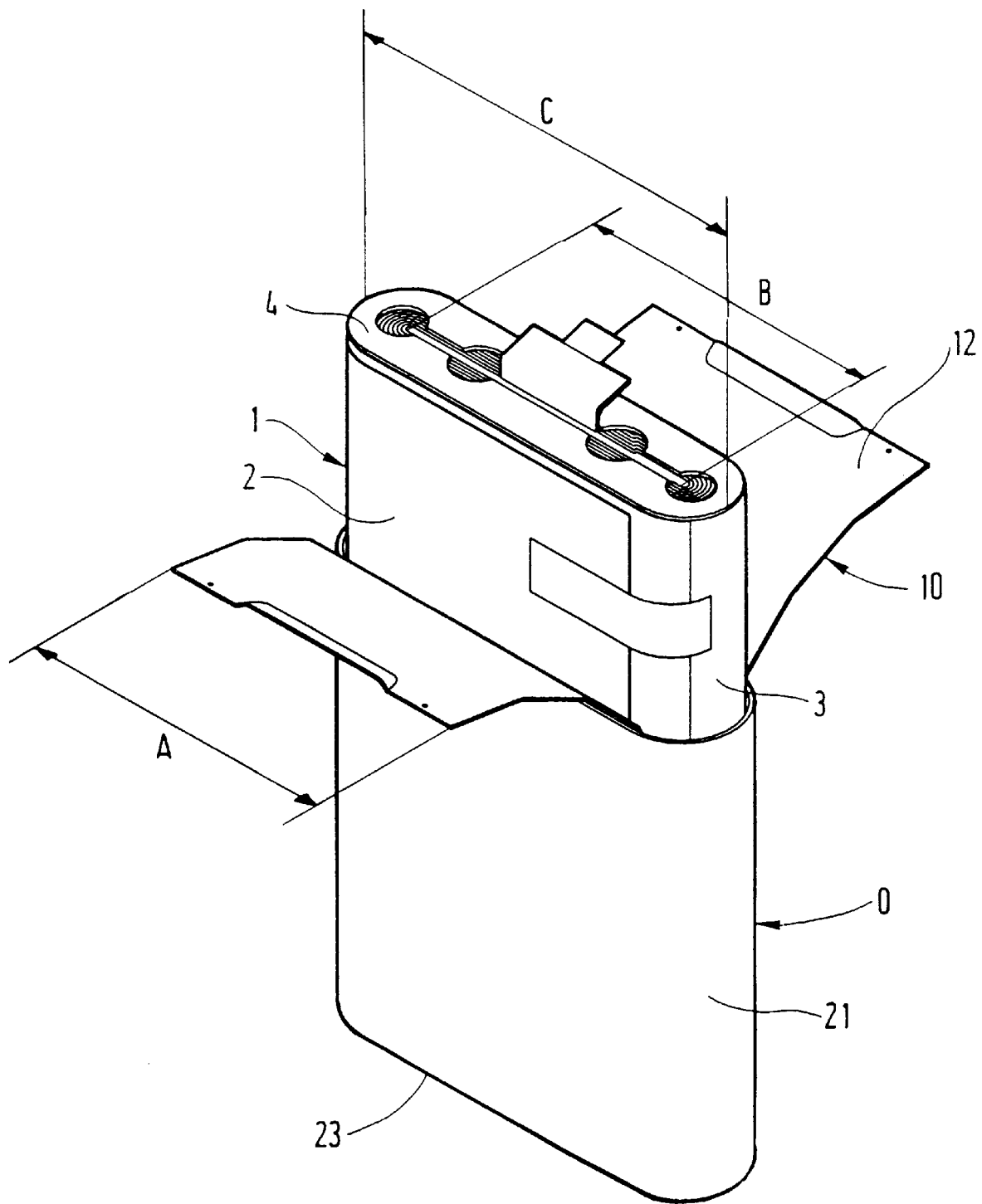
FIG. 1 is an exploded perspective view of a cell according to the invention.
Figure 2:
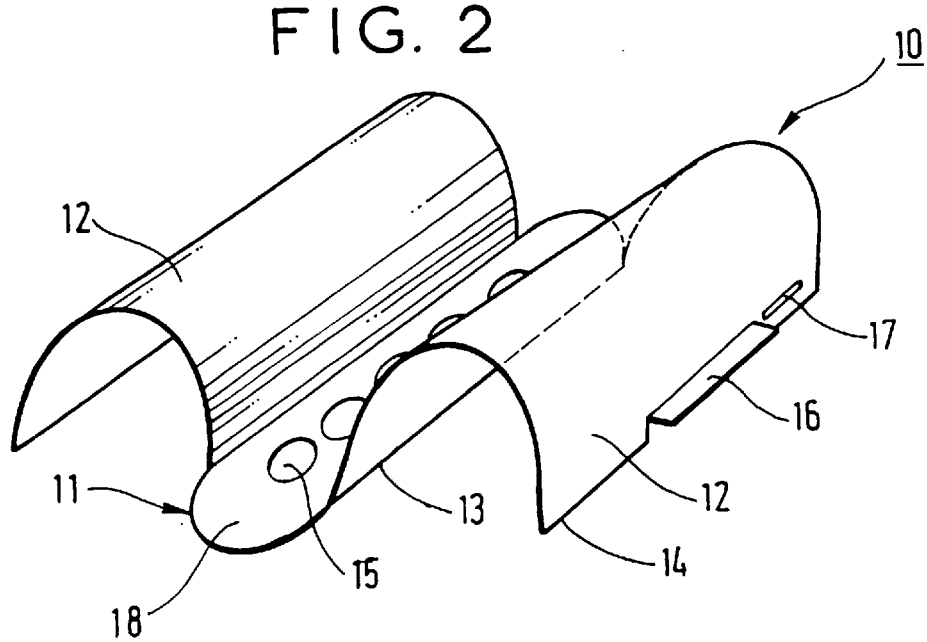
FIG. 2 is a perspective view of one embodiment of an insertion device in accordance with the invention.

FIG. 1 shows a coil 1 having a total width C crushed to the shape of a parallelepiped with large plane faces 2 of width B with rounded edges 3, a top insulative spacer 4 and an insertion device in accordance with the invention referred to as a "sock" 10 and comprising two conductive tapes 12 of width A such that $C > A \geq B$. The tapes 12 are connected by a central blade 11 (cf. FIG. 2), enabling the coil 1 to be inserted and held in position in the pot 20. The latter has opposite plane faces 21, a base 23 (FIG. 3) and a lid that is welded on after inserting the coil 1.

In the sock in accordance with the invention (FIG. 2), the tapes 12 form parabolic cylindrical sectors attached by a straight edge 13 to the blade 11, their other, free straight edges 14 being adapted to bear on the inside walls 21 of the pot 20 after insertion of the coil and the sock. The concave side of the cylindrical sectors therefore faces outwards after insertion. The top of the inside walls 21, on which the tapes 12 bear, is stiffened by the lid. The tapes 12 are therefore perfectly capable of withstanding the pressures exerted by the coil 1, as symbolized by the arrows in FIG. 3, which they transmit upwards to the walls 21 and downwards to the edges of the blade 11, i.e. into areas that are not deformable or only slightly deformable.

Figure 3:
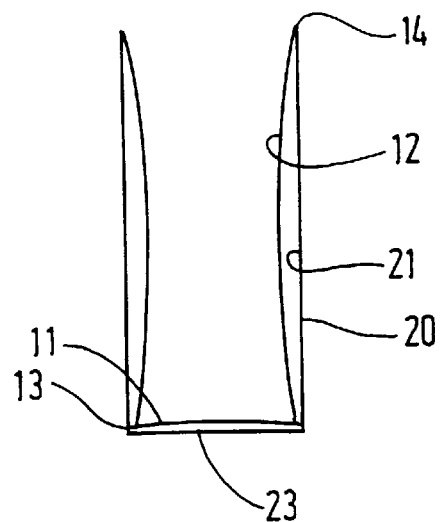
FIG. 3 is a diagrammatic part-sectional view showing the device from FIG. 2 in a container.

In one embodiment shown in FIG. 3 the cylindrical sectors 12 can be formed on a conic section directrix, in particular a circular or parabolic arc.

Figure 4:
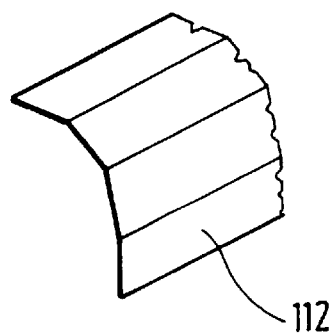
FIG. 4 is a fragmentary view of another embodiment of the insertion and holding device according to the invention.

In another embodiment shown in FIG. 4, the cylindrical sectors 112 can be made up of planer portions joined together in such manner as to approximate the arcs previously described to a greater or lesser degree.

The blade 11 can terminate in half-rounds 18 so as to mate better with the corresponding shape of the bottom of the pot and offer better location.

To lighten the device, openings 15 can be provided in the blade 11 and even in the tapes 12.

The free edges 14 of the tapes 12 can include a lug 16 facilitating grasping and pushing during insertion of the sock 10 into the pot 20. The electrical connection of the sock 10 and the pot 20 can be effected by electrical welds in the areas 17.

The tapes are advantageously made from spring stainless steel, copper-plated on at least the inside face, to provide a good electric contact between the external electrode of the coil 1 and the tapes 12 that bear on it.

There is claimed:

1. A cell comprising:

a container having a bottom and two opposite plane walls;

a stack of electrodes having a width and a thickness, said stack including two opposite plane faces and a bottom having a length which is the same as the width of said stack and a width which is the same as the thickness of said stack; and a device for inserting said stack in said container and maintaining it under a compressive force therein, said device including a central blade having dimensions at least equal to those of said bottom of said stack joined by its opposite longitudinal edges to two tapes having dimensions at least equal to those of said plane faces of said stack and forming elastic arcuate sectors each with a concave side facing outwardly, wherein said device is adapted to be disposed between said plane faces of said stack and said plane walls of said container with said blade being disposed between said bottom of said container and said bottom of said stack.

2. The cell claimed in claim 1 wherein the dimensions of said tapes are 1 mm to 2 mm greater than the width of said plane faces.

3. The cell claimed in claim 1 wherein said arcuate sectors are formed on a conic section directrix, in particular a circular or parabolic arc.

4. The cell claimed in claim 1 wherein said arcuate sectors include a plurality of planar member joined together in series.

5. The cell claimed in claim 1 wherein said tapes are made of stainless steel and are copper-plated at least on their inside face.

6. The cell claimed in claim 1 wherein said blade and/or said tapes is or are apertured.

* * * * *